Dec. 23, 1930. F. G. GREAVES ET AL 1,786,060

LUMBER CARRIER

Filed Aug. 29, 1927 5 Sheets-Sheet 1

INVENTOR
FREDERICK G GREAVES
SERN P. WATT
BY
Cook & Robinson
ATTORNEY

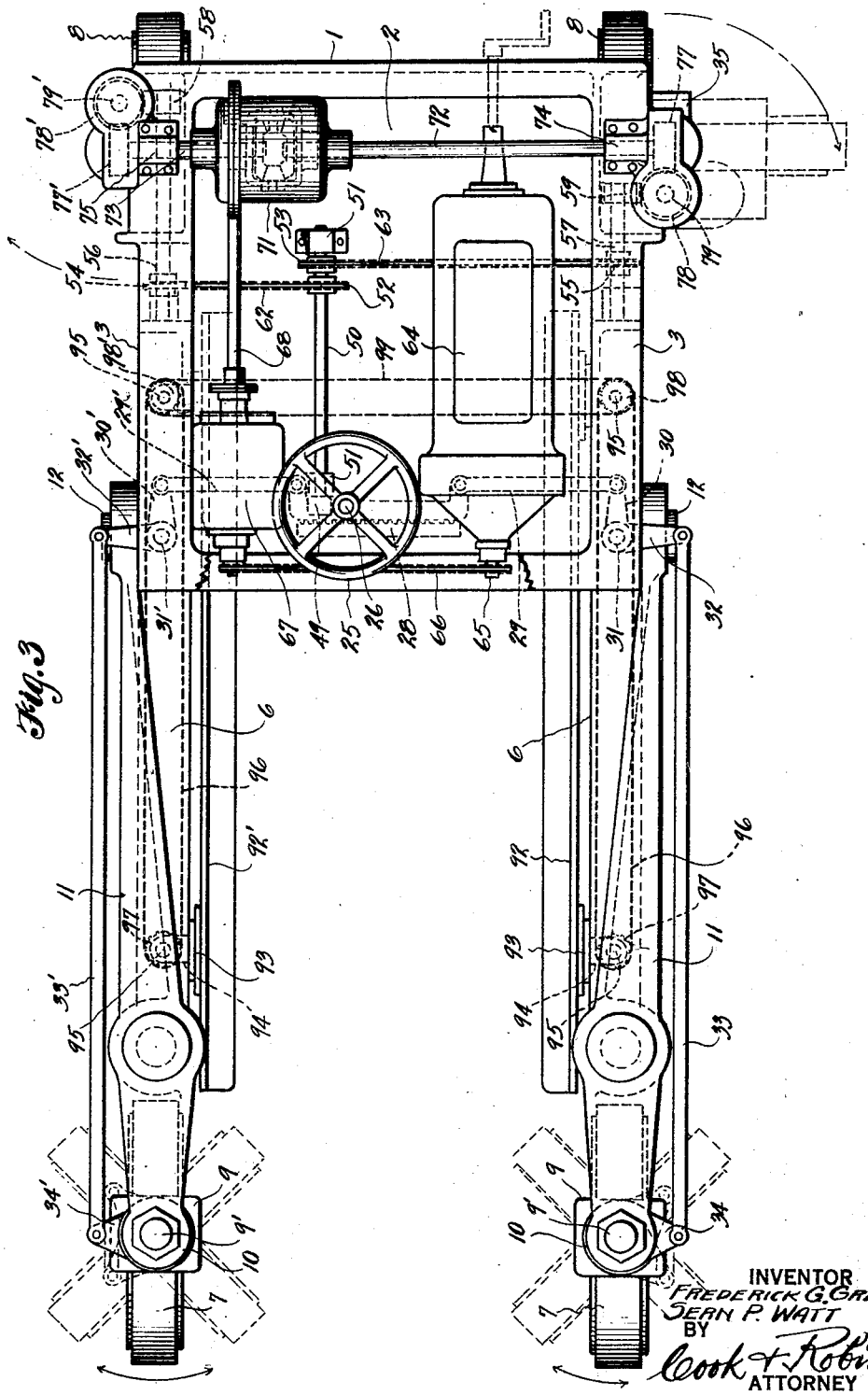

Dec. 23, 1930.  F. G. GREAVES ET AL  1,786,060
LUMBER CARRIER
Filed Aug. 29, 1927   5 Sheets-Sheet 3
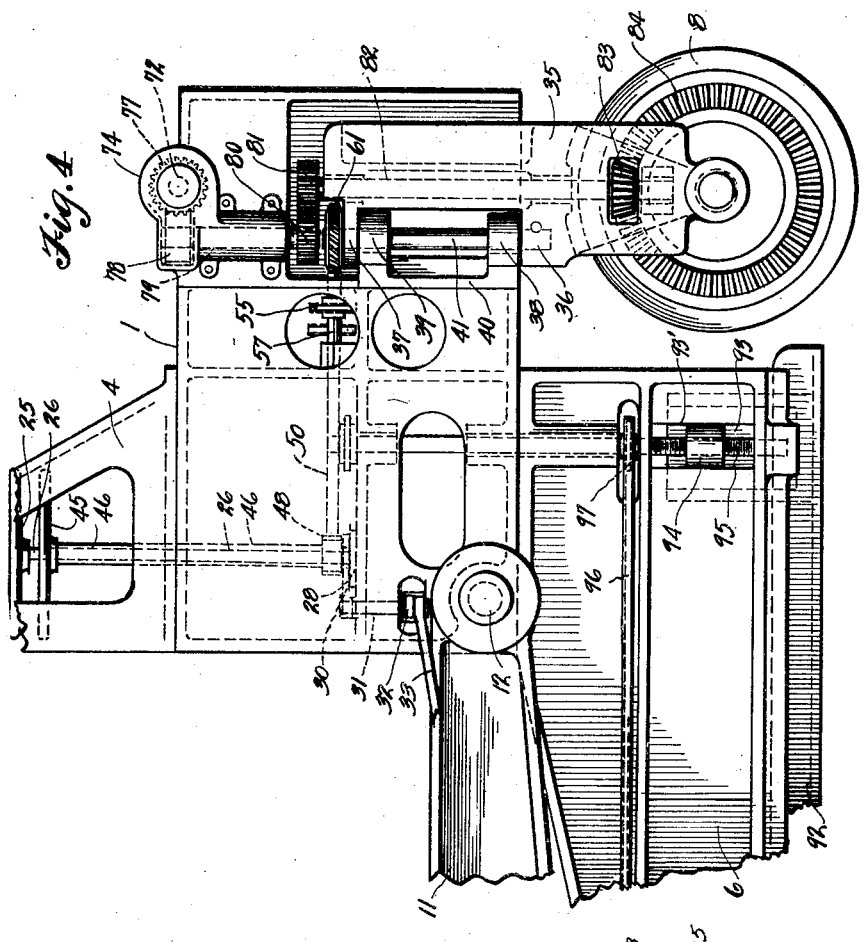
INVENTOR
FREDERICK G. GREAVES
BY SERN P. WATT
Cook + Robinson
ATTORNEY Dec. 23, 1930. F. G. GREAVES ET AL 1,786,060

LUMBER CARRIER

Filed Aug. 29, 1927 5 Sheets-Sheet 4

INVENTOR
FREDERICK G. GREAVES
SERN P. WATT
BY
Cook & Robinson
ATTORNEY

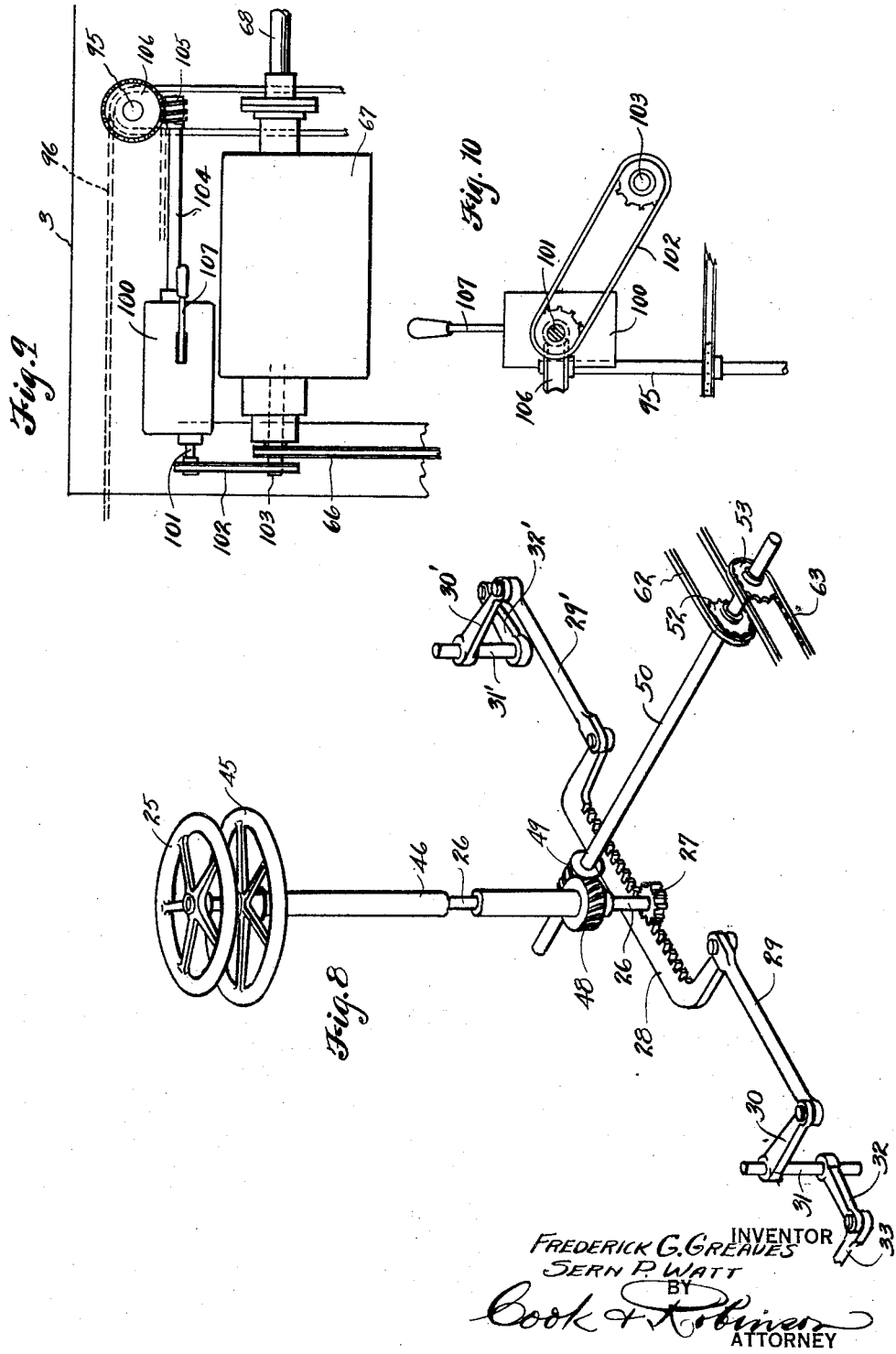

Patented Dec. 23, 1930

1,786,060

UNITED STATES PATENT OFFICE

FREDERICK G. GREAVES AND SERN P. WATT, OF SEATTLE, WASHINGTON

LUMBER CARRIER

Application filed August 29, 1927. Serial No. 216,244.

This invention relates to improvements in lumber carriers, and more particularly to carriers of that type, or character, especially designed for use about sawmills and lumber yards for the transferring and stacking of packs of lumber; the present invention being in the nature of an improvement over the carrier and crane illustrated and described in our co-pending application, Serial Number 131,070, filed August 23, 1926.

It is the principal object of the present invention to provide a combined lumber carrier and crane that may be operated with a greater degree of satisfaction than that disclosed in the former application, especially when operated over uneven ground, and which embodies both front and rear wheel steering facilities whereby lateral travel and abrupt turning is made possible.

More specifically stated, the invention resides in the provision of a lumber carrier of that type having its frame structure adapted to straddle a pile of lumber and equipped with supports for carrying the lumber pile. Also, having paired front steering wheels and paired rear driving wheels; the latter being adapted to be adjusted from parallel relation with the fore and aft line of the carrier to positions at right angles thereto so as to permit the carrier to be swung about either front wheel as a pivot in making a turn.

Another object of the invention is to provide yieldably mounted levers through which the forward part of the carrier frame is supported from the front wheels so as to permit independent vertical movement of these wheels relative to each other and to the frame so as to avoid the transmittance of any uneven pressure to the frame incidental to operation over uneven surfaces.

A still further object of the invention is to provide the carrier with a jib crane for facilitating the handling or stacking of lumber and which may be readily disconnected therefrom when not required or desired.

Still another object of the invention is to provide an improved and novel driving and steering mechanism for the rear wheels.

Other objects of the invention reside in the various details of construction and combination of parts as is hereinafter described.

In accomplishing the various objects of the invention, we have provided the improved details of construction, the preferred forms of which are illustrated in the accompanying drawings, wherein—

Figure 3 is a plan view of the carrier, with the crane structure removed.

Figure 4 is an enlarged side elevation of the rear portion of the carrier.

Figure 5 is a rear end view of the carrier and crane.

Figure 6 is an enlarged, rear end view of the carrier, showing the rear wheels as turned transversely to the fore and aft line of the frame.

Figure 7 is a perspective view of the arrangement of the gearing for driving and steering one of the rear wheels.

Fig. 8 is a detail perspective view of parts of the steering gear for the front and rear wheels.

Fig. 9 is a front elevation of the transmission mechanism for controlling the raising or lowering of the carrying members.

Fig. 10 is a top view of the same.

Figures 1, 2:
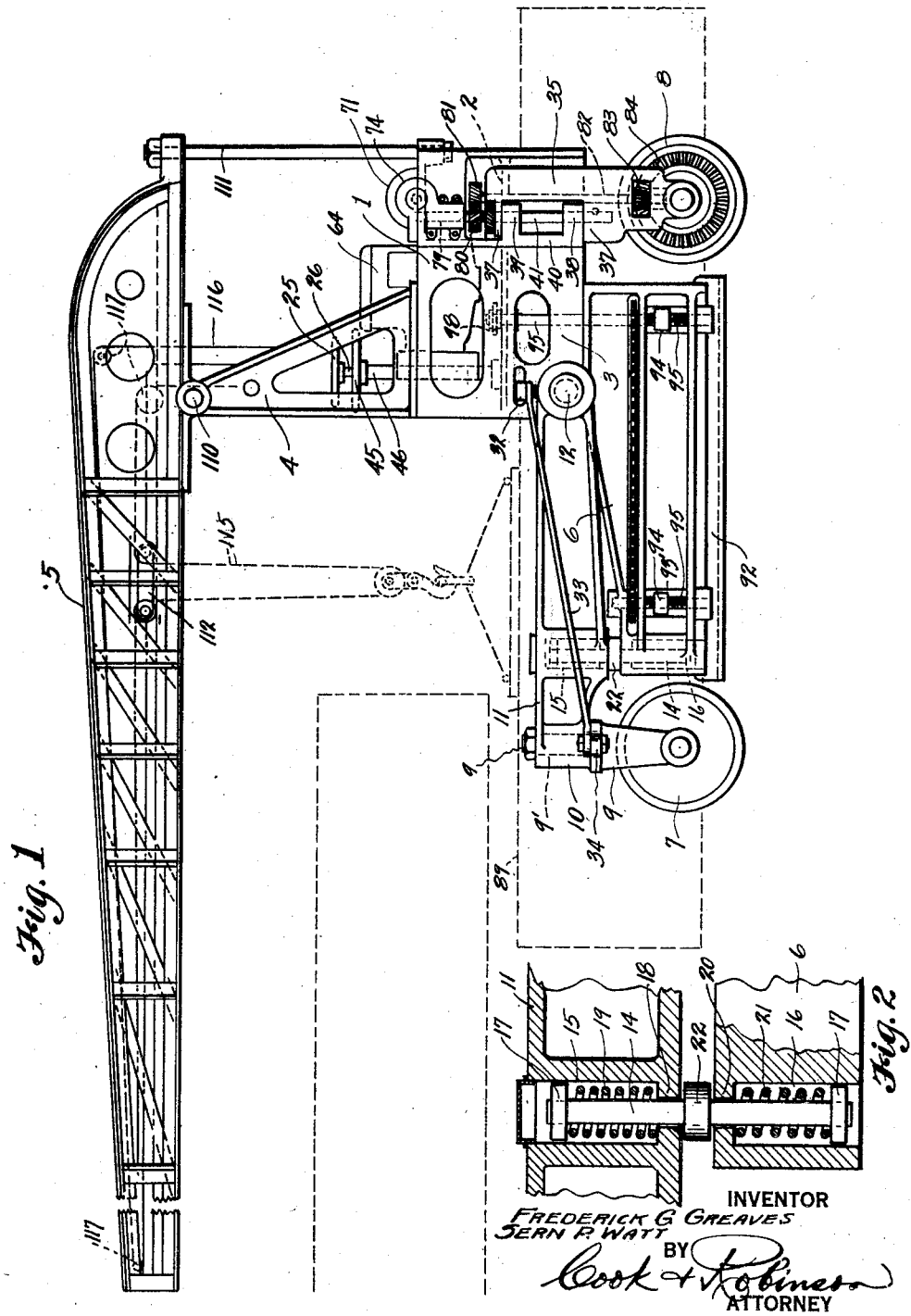
Figure 1 is a side elevation of a lumber carrier and crane embodied by the present invention.
Figure 2 is an enlarged, sectional detail of the spring support interposed at each side of the carrier frame between the forward portion of the carrier and the front wheel mounting levers.

Referring more in detail to the drawings—

The frame structure of the carrier comprises the main bed, or body, portion which is designated in its entirety by reference numeral 1. This comprises a horizontal platform 2 on which the operator stands and whereon the engines and transmission mechanism for the carrier are mounted. It also includes the opposite side frames 3—3 upon which paired standards 4—4 for mounting the crane, or jib, 5, are securely fixed. Along the under edges of the side frames 3—3, parallel and forwardly directed opposite side frames 6—6 are rigidly secured; these frames extend along opposite sides of the loads handled and serve, as presently described, as the load supporting means.

The whole frame structure and crane is supported for travel by means of paired front wheels 7—7 and paired rear wheels 8—8; the front wheels being mounted by means of yokes 9, which, in turn, are pivotally mounted by vertical axes 9' in bearings 10 provided therefor at the forward ends of a pair of frame supporting levers 11 that overlie the forwardly directed frames 6—6 parallel with the fore and aft line of the carrier. At their rearward ends, these levers 11 are pivotally fixed by pivot pins 12 to the forward lower corners of the side frames 3—3.

The forward ends of the frames 6—6 are suspended from the levers 11 through the intermediacy of yieldable connections which not only provide the required supports but which also permit of a required flexibility of movement in the frame structure that facilitates operation over uneven surfaces. As is best shown in Figure 2, a vertical connecting pin 14 joins each arm 11 with its corresponding frame member 6. These pins have their opposite end portions slidably contained, respectively, within vertically alined bores 15 and 16 in the levers and frames and they are provided, at their opposite ends, with collars 17. The bore 15 of each of the levers 11 is provided with an annular shoulder 18 at its lower end and a coiled compression spring 19 is interposed about the pin to bear at its ends against the collar at the upper end of the pin and against the shoulder 18. Likewise, the bore 16 of the frame has an annular shoulder 20 at its upper end and a coiled compression spring 21 is interposed between this shoulder and the collar at the lower end of the pin. These springs are sufficiently strong to support the frame and loads carried thereby and they permit independent freedom of action up or down of either wheel in travel over uneven surfaces, and, in this way, they relieve the frame structure of any undesirable strain. Preferably, the springs 19 are of greater compression strength than the springs 21, so as to give a greater load carrying range without compression of both springs simultaneously, and collars 22 are fixed on the pins 14 between the levers and frames 6 so as to limit movement of the pins inwardly with respect to either socket 15 and 16.

The front wheels 7—7 are steered by mechanism comprising a hand wheel 25 that is fixed to the upper end of a vertical shaft 26 mounted in the frame structure 1 in position for easy access by the operator. At its lower end, the shaft 26 has a pinion gear 27 fixed thereto, see Figure 8. for meshing with a slidably mounted rack 28 extending transversely with respect to the frame and which has its opposite ends connected, respectively, by links 29—29' with levers 30—30' that are fixed to the upper ends of vertically and rotatably mounted shafts 31—31'. These shafts are supported in bearings fixed to the opposite side frames 3 and they have lever arms 32—32' fixed to their lower ends in such manner as to extend outwardly from the sides of the frames and these are connected, by links 33—33', with steering arms 34—34' formed on the front wheel mounting yokes. The connections are such that by rotation of the steering wheel 25 in opposite directions the rack is adjusted accordingly and through the link and lever mechanism the wheels will be adjusted for the purpose of steering the carrier.

The rear end portion of the frame structure is supported by paired driving wheels 8—8 that are located at opposite sides of the frame. Each of these wheels is revolubly mounted mounted between the depending legs of a casting 35 which has laterally extending and vertically alined bosses 36 and 37 which overlap correspondingly arranged bosses 38 and 39 on a bracket 40 that is secured to the main frame. Vertical shafts 41 extend through the overlapped bosses of the brackets and castings to pivotally mount the latter and to provide for steering as presently described.

For normal travel of the carrier the rear wheels are not used for steering purposes and they are held in parallel alinement with each other and with respect to the longitudinal line of the carrier by means of their steering mechanism. This mechanism comprises a steering wheel 45 that is mounted closely beneath the steering wheel for the front wheels on the upper end a tubular shaft 46 which incloses the steering wheel shaft 26 previously described, and which, at its lower end which terminates just above the platform 2, has a spiral gear 48 thereon meshing with a spiral gear 49 on a horizontal shaft 50 mounted in bearings 51—51 and extending toward the rear of the frame. On this latter shaft are sprocket wheels 52—53 which are alined, respectively, with sprocket wheels 54—55 keyed on shafts 56—57 rotatably mounted at opposite sides of the frame, parallel with shaft 50. Driving connection between the sprockets 52—53 and sprockets 54—55 is provided through the intermediacy of sprocket chain belts 62—63. The shafts 56 and 57 are equipped, respectively, with worm gears 58—59 in mesh with gears 60—61 that are fixed to the upper ends of the vertical shafts 41 whereby the wheel supporting castings are pivotally connected to their supports at opposite sides of the frame. By means of this steering mechanism, the shafts 41 may be rotated in either direction and, since they are keyed or otherwise fixed at their lower ends to the castings, the latter will be turned thereby to adjust the rear wheels to positions for lateral swinging of the end of the carrier or for forward or rearward travel. The steering gear also serves to retain the parallel relation of the wheels at all times.

For the purpose of driving the rear wheels, we have provided a suitable engine, designated at 64, which is mounted on the platform of the main frame at one side and which has a chain drive connection with its shaft 65, as at 66, through a suitable change speed and reverse transmission mechanism, designated at 67, with a rearwardly directed drive shaft 68. This latter shaft, by means of a gear 69 at its rearward end meshing with the master gear 70 of a differential mechanism designated at 71, drives the differential shafts 72—73 which extend to opposite sides of the frame where they are contained within bearings 74—75. At their outer ends, these differential shafts are equipped, respectively, with spiral gears 77—77' which mesh with gears 78—78' that are fixed on the upper ends of shafts 79—79' contained vertically in bearings in the opposite side frames 3—3. These shafts 79—79' are equipped, respectively, with gears 80—80' at their lower ends which mesh with gears 81—81' at the upper ends of vertical shafts 82—82' carried in the castings 35 and which, at their lower ends, have beveled gear pinions 83—83' thereon meshing with ring gears 84—84' fixed concentrically on the wheels 8—8. In this arrangement the shafts 79—79' are mounted in coaxial alinement with the pivot shafts 41—41 which support the castings and this provides for adjusting the castings in steering the wheels without interference with the driving connection between gears 80 and 81, and also that the driving connection will, in no way, interfere with the steering mechanism since the relation of the parts is not changed by the steering action.

By reference to Figure 3 it will be noted that the manner of mounting the casting 35 at one side of the carrier is just the reverse of that at the other side, that is, at one side the pivot shaft 41 is directly ahead of the drive shaft 82, while at the other side it is directly back of it.

It is also noted that the driving wheels are so placed as to pivot about the vertical axes 41 and that the relation of the pivotal center line to the fore and aft center line of the wheels is such as to produce a result in which the said drive wheels are directly opposite each other with reference to either of the extreme positions, one of which is the direct forward or the reverse of it, while the other is at right angles to it, thus admitting of a translation directly across the path of the first movement. Also, these drive wheels are so positioned as to gearing thrusts that they are at all times in a state of balance no matter under what conditions of work or at what positions they may be used. This steering arrangement also allows the machine to be steered either independently of or in conjunction with the forward wheel steering mechanism.

In using the carrier for carrying a pack or stack of lumber, the carrier frame is run over the stack so as to straddle it, as shown in Figures 1 and 5. To permit this, the platform 2 of the main frame is made quite high and the side frames 3—3 and extension frames 6—6 are spaced apart in parallel relation so as to leave the intermediate space entirely clear. Stacks of lumber, as designated at 89, to be transferred by the carrier are stacked on cross bars 90 which are notched at their ends, as at 91, for the entrance of the supporting flanges of the carrying means provided in connection with the side frames 6. This carrying means consists of the parallel and horizontally disposed angle iron beams 92—92' which are supported at their ends by slides 93 which operate vertically in guide slots 93' in the frames 6. Each slide is provided with a boss or nut 94 through which a screw 95 extends. The several screws are rotatably fixed at their upper and lower ends in suitable bearings in the frames 6 and those at each side are operatively connected so as to rotate together and in the same direction by means of sprocket chain belts 96 operating about sprockets 97—97' on the screws. The rear screws 95 at each side are extended upwardly to the level of the platform 2 and are there equipped with sprocket wheels 98—98' and a sprocket chain belt 99 extends about these so that both sets of screws may be rotated in unison. For mechanically actuating the screws, we have provided a transmission mechanism, which may be of any desirable character whereby driving of the screws in either direction may be effected. This is not illustrated in detail but is generally indicated in Figs. 9 and 10 at 100. The mechanism comprises a shaft 101 driven by a chain belt 102 from the shaft 103 of the main drive transmission mechanism 67, and a shaft 104 provided with a worm 105 operating in mesh with a gear 106 on the extended upper end of the adjacent screw 95. A shift lever 107 is provided for the mechanism whereby the direction of rotation of the screws may be controlled for either raising or lowering the load carrying flanges 92.

The load carrying beams 92—92' have their horizontal flanges turned inwardly to serve as the load supporting means and these flanges engage beneath the notched or shouldered ends of the cross bars on which the loads are stacked.

The boom, or jib, 5 of the crane construction is mounted near its rearward end on a cross pin 110 extended between the upper ends of the standards 4 and at its rearward end is connected by two tie rods 111 with the rear edge of the main frame 1. The boom extends horizontally in the central fore and aft line of the machine and is equipped for the movement of a carriage 112 along it for the raising and lowering of the loads to facilitate stacking. This crane also permits the transferring of two loads simultaneously by supporting one from the crane while one is carried in the usual manner.

In Figure 1, we have shown the hoisting cable 115 and also a racking cable 116 and these are extended over suitable guide pulleys as at 117 and to any suitable winding mechanism, not shown, which may be operated by connection with the engine, or otherwise.

It is to be understood that the crane is not essential to the use of the carrier for ordinary work and may be easily and quickly detached by running it upon a rack and then removing the cross pin 110 and the rods 111. It is very useful, however, in stacking, loading or transferring piles of lumber and makes possible the carrying of two loads instead of one where the surface over which the carrier operates is not too uneven for safety.

It may be mentioned also that the crane has many other uses outside of the handling of lumber and when used for handling heavy loads, a counter balancing load may be held in the carrier itself.

The important features of the present carrier which makes it more practical and more desirable for use than machines heretofore used reside in the novel construction of the levers 11 and in their radial action which permits independent action of the front wheels whereby strain, or twist, on the frame and load incident to travel over uneven surfaces is avoided. Also, in the provision of the springs of unequal strength for supporting the frame from the levers 11 for giving greater flexibility and greater range of loading without collapsing with springs simultaneously.

Another feature resides in the construction that provides for the load carrying flanges remaining in parallel relation regardless of the unevenness of surfaces over which the carrier wheels travel so that the load is not disturbed.

Other features accomplished reside in the manner of gearing, steering and driving the rear wheels so that they remain at all times in a state of balance and permit a translation of movement of that end of the carrier directly across the longitudinal line of the carrier in turning.

Having thus described our invention, what we claim as new therein and desire to secure by Letters Patent, is:

In a lumber carrier of the character described, opposite side frames, a pair of vertical screws rotatably mounted in each side frame, and a pair of angle bars for engaging beneath the opposite side edges of a load, each of said bars having lugs thereon through which the screws extend, means for rotating all of the said screws in unison to raise or to lower the angle bars.

Signed at Seattle, Washington, this 27th day of June, 1927.

FREDERICK G. GREAVES.
SERN P. WATT.